(12) United States Patent
Sandell et al.

(10) Patent No.: US 7,191,142 B1
(45) Date of Patent: Mar. 13, 2007

(54) INTERNET BASED GOODS DELIVERY SYSTEM

(75) Inventors: Randall Joseph Sandell, Louisville, KY (US); Frank Anthony Gigliotti, Louisville, KY (US); Mark Daniel Shirkness, Louisville, KY (US); Gregory Todd Ellington, Louisville, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/475,630

(22) Filed: Dec. 30, 1999

(51) Int. Cl.
*G06F 9/46* (2006.01)
*G06F 15/02* (2006.01)
*G06Q 99/00* (2006.01)

(52) U.S. Cl. .............................. 705/9; 705/1
(58) Field of Classification Search ............. 705/1, 705/26, 27, 28, 29, 500, 7, 8, 9, 10, 11, 22, 705/23, 400, 401, 402
See application file for complete search history.

(56) References Cited

U.S. PATENT DOCUMENTS

| | | | | |
|---|---|---|---|---|
| 5,485,369 A | * | 1/1996 | Nicholls et al. | 705/9 |
| H1743 H | * | 8/1998 | Graves et al. | 700/236 |
| 5,809,144 A | | 9/1998 | Sirbu et al. | |
| 5,913,210 A | * | 6/1999 | Call | 707/4 |
| 5,963,915 A | * | 10/1999 | Kirsch | 705/26 |
| 6,070,793 A | | 6/2000 | Reichl et al. | |
| 6,081,789 A | * | 6/2000 | Purcell | 705/26 |
| 6,134,561 A | * | 10/2000 | Brandien et al. | 707/104.1 |
| 6,335,702 B1 | | 1/2002 | Itoh et al. | |
| 6,393,436 B1 | | 5/2002 | Vaimberg-Araujo | |
| 6,436,419 B1 | | 8/2002 | Sun et al. | |
| 6,889,194 B1 | * | 5/2005 | Kadaba | 705/1 |
| 2003/0014318 A1 | * | 1/2003 | De la Motte et al. | 705/26 |

FOREIGN PATENT DOCUMENTS

| | | | |
|---|---|---|---|
| JP | 11-250129 A | * | 9/1999 |
| JP | 2001297270 A | * | 10/2001 |
| WO | WO 01/13261 A1 | * | 2/2001 |

OTHER PUBLICATIONS

James A. Senn, "WISs at Federal Express", Jul. 1998, Communications of the ACM, vol. 41, No. 7, 2 pages.*
Senn, James A.; WISs at Federal Express; Jul. 1998.*

* cited by examiner

*Primary Examiner*—Igor N. Borissov
(74) *Attorney, Agent, or Firm*—Armstrong Teasdale LLP

(57) ABSTRACT

This invention provides for a method of delivering goods from a plurality of suppliers to a plurality of buyer utilizing a system having a plurality delivery agents, a plurality of stores, a plurality of good brands, and a plurality of buyers, wherein the delivery agents, stores, and suppliers are linked to a communications network. The method comprises the steps of; each store communicating order information to a logistics intermediary; the logistics intermediary communicating invoice information from the order information to any one of the delivery agents based on an Internet based electronic manifest; the delivery agent noting exceptions and communicating the exceptions to the logistics intermediary; the logistics intermediary communicating exceptions to the supplier and to the store from which the goods were ordered; and, after shipping the goods the delivery agent communicating the status of the shipped goods to the logistics intermediary.

52 Claims, 14 Drawing Sheets

INTERNET BASED GOODS DELIVERY SYSTEM

CROSS REFERENCE TO RELATED APPLICATIONS

This application is related to co-pending U.S. Patent application, 9D-EC-19335, Ser. No. 09/475,961, entitled "Delivery Management System", filed on Dec. 30, 1999, assigned to the assignee of the present invention, and herein incorporated by reference. This application is also related to co-pending U.S. Patent application, 9D-EC-19319, Ser. No. 09/475,962, entitled "Capacity Monitoring Process for A Goods Delivery System", filed on Dec. 30, 1999, assigned to the assignee of the present invention, and herein incorporated by reference.

BACKGROUND OF THE INVENTION

This invention generally relates to a goods delivery management system, and more particularly to an Internet based goods delivery management system which minimizes the need for direct human interaction.

At least one other company has employed an Internet based goods delivery system wherein the goods can be ordered from one particular store and delivered to a designated buyer's address. For example Home Depot Company has employed an Internet based appliance delivery system for more than a year. This system enables a buyer to place an Internet based order for a branded good, and the respective good be delivered to the buyers designated address. Once the order is placed the order is sent to a respective delivery agent via the Internet. The respective delivery agent then delivers the respective good. As such, this good delivery system is a order fulfillment system. This system has a number of disadvantages, including, for example: the system could not automatically generate order reschedules resulting from "refusals", "cancellations", "damaged" goods, "suspends", and "shorts".

Delivery management systems are known that provide Internet based delivery of standard sized packages, one particular example is the FEDERAL EXPRESS® goods delivery system. In this specification non-standard sized packages are packages that are not delivered by air carriers and mail delivery services, and typically are packages that weigh over about 100 lbs. (45 kg). The delivery of non-standard size packages generally requires a delivery agent who is equipped to ship and install the delivered goods. For example, there currently exists a plurality of appliance delivery services that receives the appliance from the appliance manufacturer, delivers and installs the appliance after the purchaser has ordered the appliance from a local appliance store. This entire operation is manually executed based on a delivery manifest. The delivery manifest is typically a document identifying the delivery agent's goods shipment schedule.

It is desirable to provide a system and method for the delivery of non standard size goods that minimizes direct human contact between the buyer, the supplier, and the delivery agent. It is desirable to employ an Internet based goods delivery system where all parties can place orders, exchange orders, wherein the same information available to each user on a near instantaneous basis while minimizing the need for direct human interaction. It is desirable to provide a system where orders, including a plurality of manufacture branded goods, can be contemporaneously placed at a plurality of stores. It is also desirable to employ a goods delivery system that can accommodate the rescheduling of orders and goods. Finally, it is desirable to provide a goods delivery system that can be modified to maximize the delivery efficiency by having the system accommodate changing delivery capacity.

BRIEF SUMMARY OF THE INVENTION

Briefly, therefore, this invention provides for a method of delivering goods from a plurality of suppliers to a respective buyer utilizing a system having at least one delivery agent, at least one store, a plurality of brands, and a plurality of buyers, wherein the at least one delivery agent, at least one store, and the plurality of suppliers are coupled to a communications network. The method comprises the steps of; the respective store communicating order information to a logistics intermediary; the logistics intermediary communicating invoice information from the order information to a respective delivery agent based on an Internet based electronic manifest; the respective delivery agent noting exceptions and communicating the exceptions to the logistics intermediary; the logistics intermediary communicating exceptions to the supplier and to the respective store from which the goods were ordered; and, after shipping the goods the respective delivery agent communicating the disposition of the shipped goods to the logistics intermediary.

DETAILED DESCRIPTION OF THE INVENTION

Figure 1:
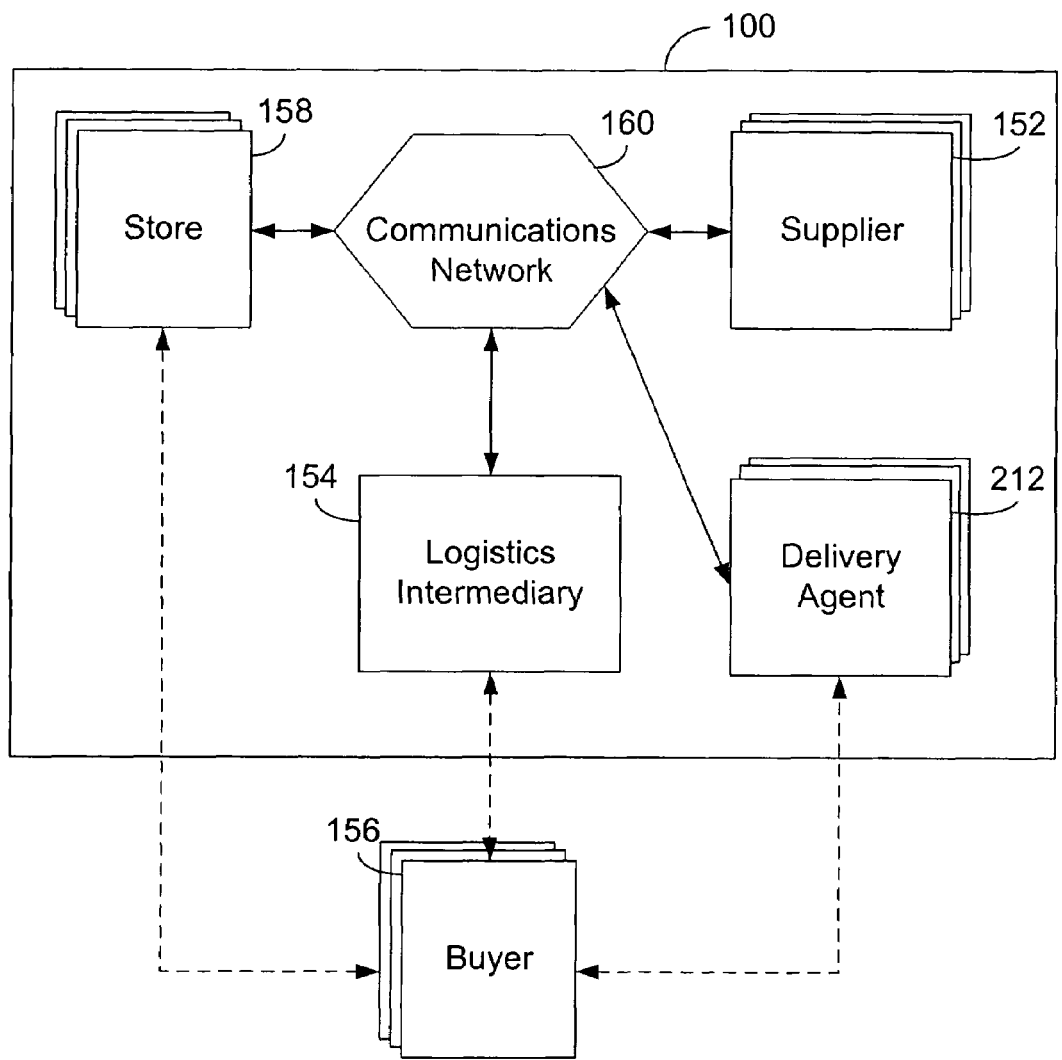
FIG. 1 is an illustration of the communication interchange between components of the goods delivery system of the present invention.
Figure 2:
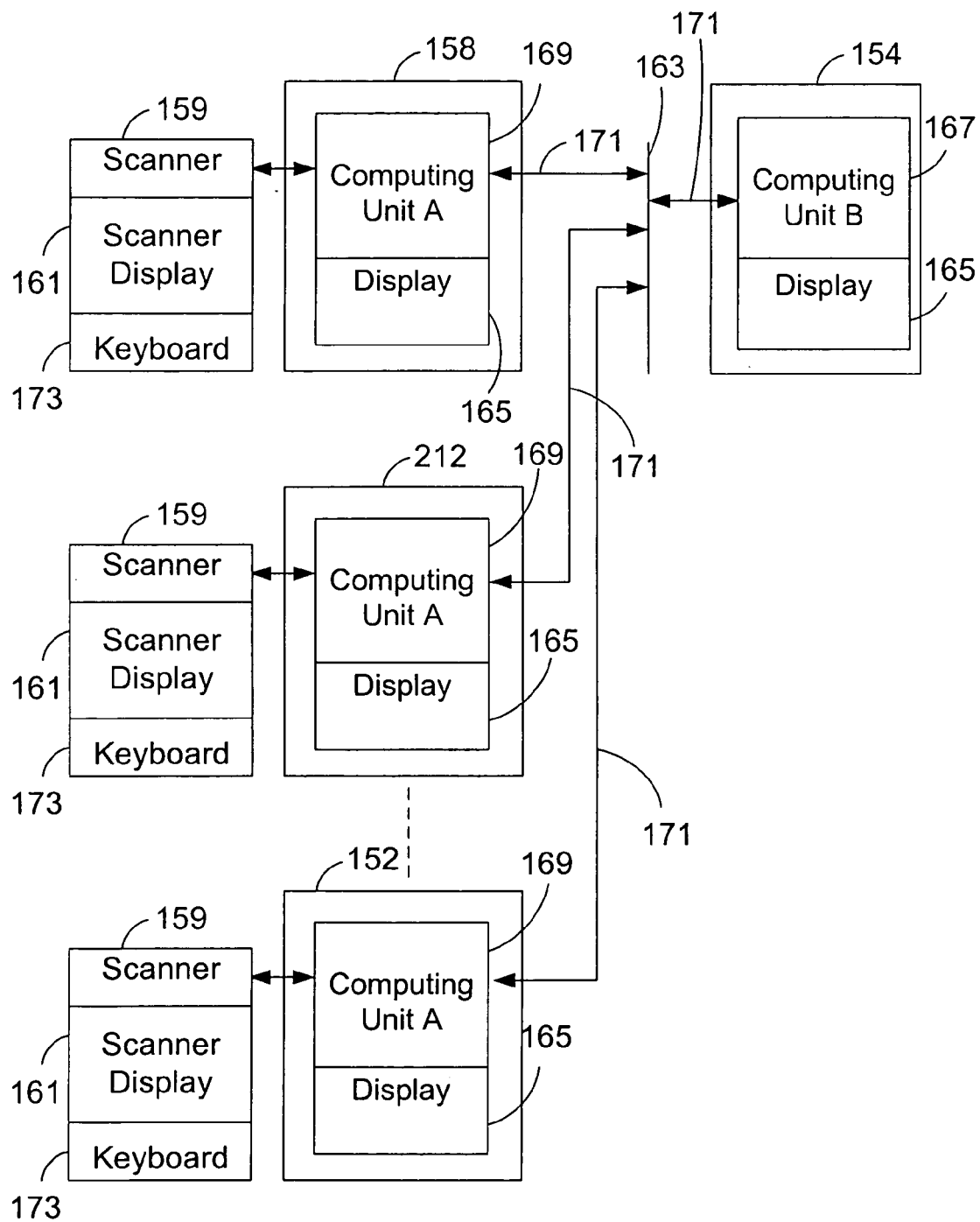
FIG. 2 is an further illustration of an Internet based communications network and associated elements illustration in FIG. 1.

Now referring to FIGS. 1 and 2, which illustrate the major components comprising goods delivery system 100, wherein like reference numbers identify like elements, goods delivery system 100 comprises components that cooperate in a process that integrates logistical supply chain parties by utilizing the Internet, commercially available scanners, and Internet based programs. The system creates the capability for a product distribution supplier to seamlessly interact with sellers of the supplier's products and suppliers to the sellers and buyers. Each supplier to the seller and alternatively, to the buyer, is hereinafter defined as a delivery agent 212. All parties of the above identified logistical supply chain may execute roles and responsibilities while minimizing human interaction between the parties.

Internet based goods delivery system 100 comprises at least one supplier 152, at least one delivery agent 212, a logistics intermediary 154, at least one store 158, and communications network 160. Buyer 156 typically places an order at a respective store 158 requesting a desired good to be shipped, a desired delivery date, and a desired installation service. At each store 158 delivery agent 212 and supplier 152 there is at least one computing unit A 169, which is coupled to a computing unit B 167 via communications network 160. In one embodiment, communications network 160 comprises a Internet based communications link 171 and a web server 163. Communications link 171 may use audio and alternatively fiber optic communications means to support server 163 based communications. In one embodiment computing unit A 169 and computing unit B 167 communicate using the Transmission Control Protocol/Internet Protocol (TCP/IP). Server 163 is typically a Internet based server which interfaces with a plurality of browsers so as to effect Internet based communications. One exemplary server is the Netscape Application Server™. Computing unit A 169 and computing unit B 167 comprises a respective browser. One exemplary browser is the Microsoft Internet Explorer 4.0™. Computing unit A 169 may also comprise a commercially available display 165 and a commercially available scanner 159. Scanner 159 also has a scanner display 161, a keyboard 173, and is adapted to interface with computing unit A 169.

In an exemplary embodiment the server may be accessed by a respective computing unit A 169 and computing unit B 167 by providing a web address having a registered Uniform Resource Locator (URL) hyperlink "www.geappliances.com" and by providing an associated password on most commercially available web browsers. Computing unit B 167, located at logistics intermediary 154, houses the software which comprises the delivery management system and the electronic manifest. It is noted that the delivery management system and the electronic manifest may be located at any component of the goods delivery system, including, for example, store 158, delivery agent 212, and supplier 152. The electronic manifest provides a delivery management control algorithm that effectuates control and enables information storage for goods delivery system 100. Additionally the delivery management system may comprise a computer program storage medium readable by computer units A and B, 169 and 167, and encoding a computer program of instructions for executing a computer process for managing the ordering and shipping of goods of a goods delivery system.

The delivery management system facilitates the scheduling of all deliveries from supplier 152 to buyer 156 by delivery agent 212, based on the delivery date selection at the point-of-sale. The point-of-sale may, by way of example and not limitation, be respective store 158, respective supplier 152, respective delivery agent 212, or respective buyers delivery address. Copending U.S. Patent application 9D-EC-19335, Ser. No. 09/475,961 provides details of the delivery management system. Copending U.S. Patent application 9D-EC-19319, Ser. No. 09/475,962 provides details of the capacity tracking and prediction portion of the delivery management system.

An exemplary embodiment of the goods delivery system 100 is further illustrated and described below. By way of example and not limitation the steps of respective buyer 156 ordering a branded appliance and having the appliance shipped and installed from respective supplier 152 to the address of respective buyer 156, is described below. It is understood that the appliance may be any movable good and, generally, is a non standard sized good requiring special installation after delivery to respective buyer 156.

Figure 3A:
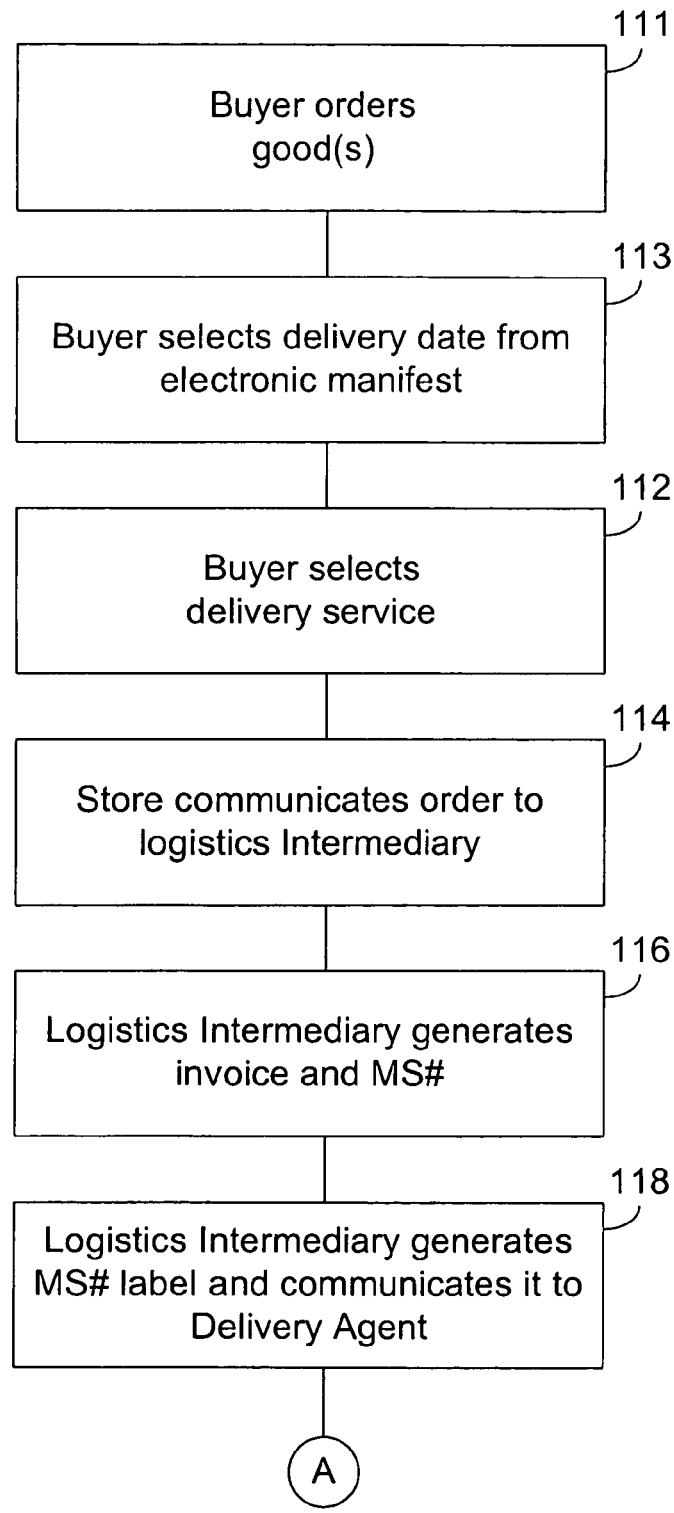
FIG. 3 is a high level business process flow diagram of the goods delivery system of the present invention.
Figure 3B:
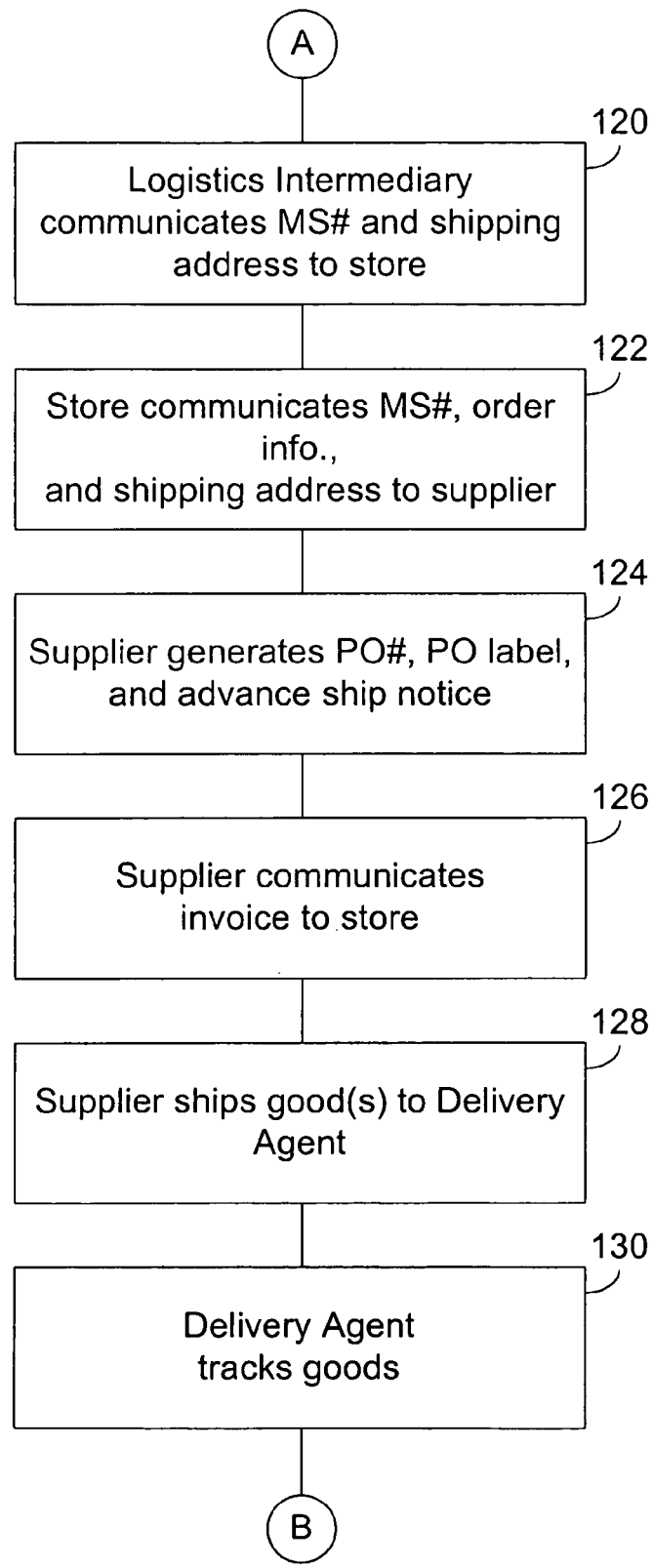
Figure 3C:
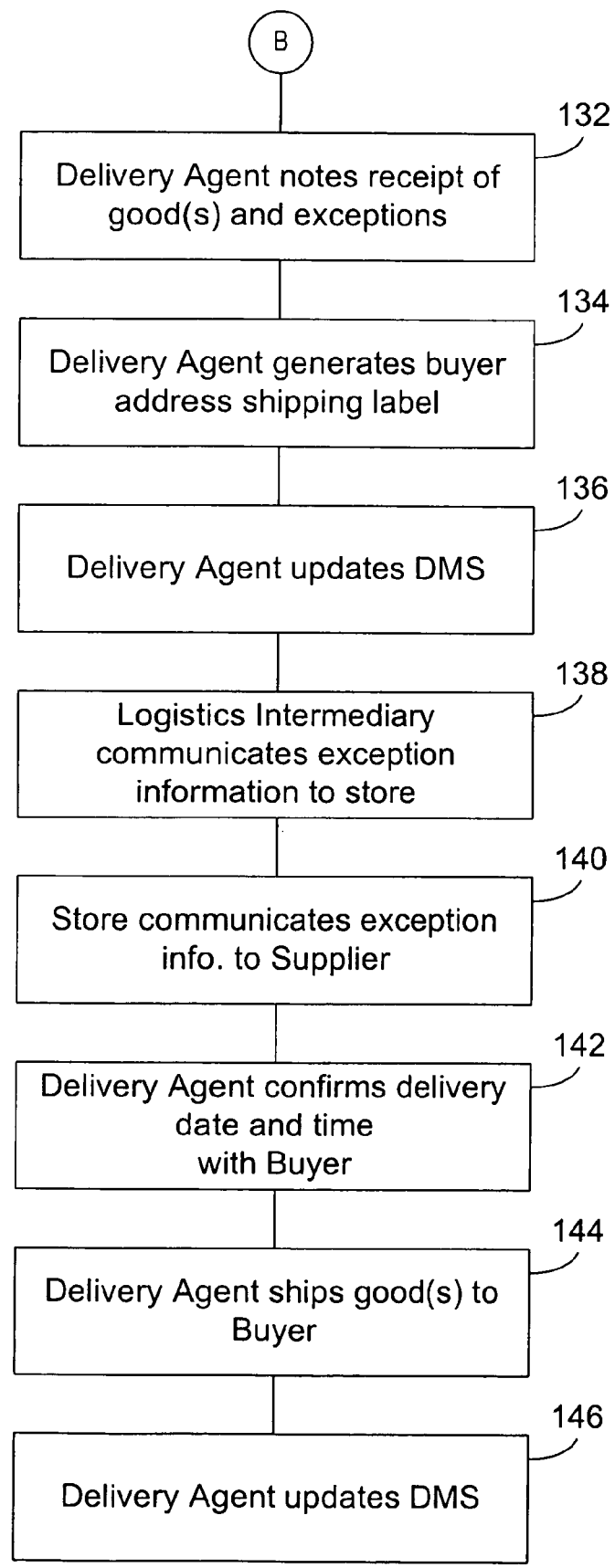
Figure 4:
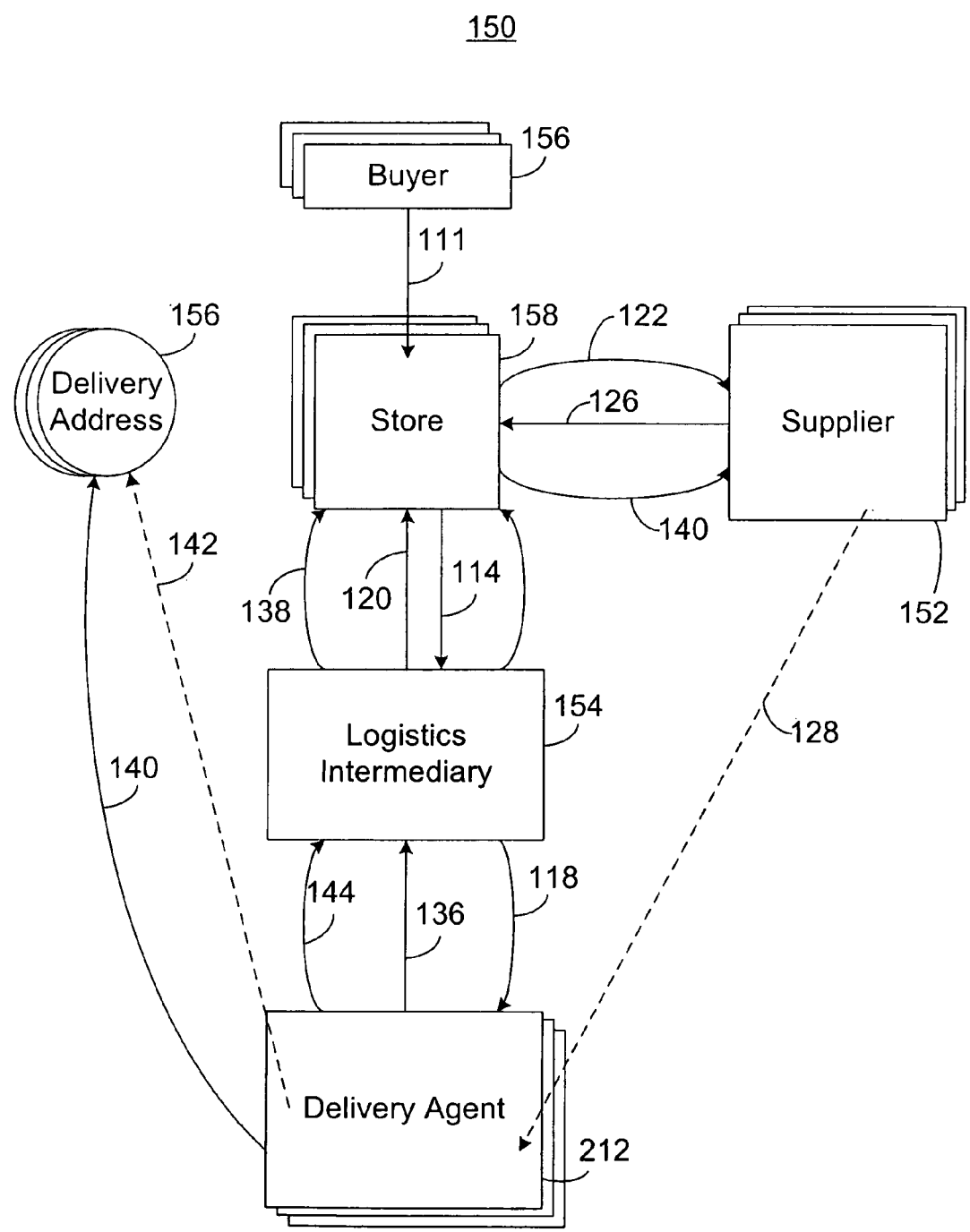
FIG. 4 illustrates a block diagram of the flow of information between the components of the goods delivery system.

Referring now to FIGS. 3 and 4, wherein like elements have like reference numbers. FIG. 3 illustrates the sequential process steps of goods delivery system 100, and FIG. 4 illustrates the exchange of information between components of the goods delivery system 100. Components of goods delivery system 100 comprise respective store 158, communications network 160, respective supplier 152, logistics intermediary 154, and delivery agent 212. Respective buyer 156 orders the branded appliance at respective store 158, step 100, selects a delivery date, step 113, and selects a delivery service from a computer display 165 which displays the electronic manifest, step 112. The electronic manifest shows all of the available shipping dates within the specified delivery zone based on output from the delivery management system. Once the delivery slot is selected within the specified delivery zone the electronic manifest is immediately updated, showing the adjusted delivery date availability in each respective delivery zone.

Store 158 communicates the order information to logistics intermediary 154, as illustrated in step 114. Order information comprises the model number, the quantity of goods, the brand of the good, the preferred installation service, the desired delivery date, and the delivery address. Examples of the preferred installation service include, removal of old appliance, connecting new appliance to water, gas, and electric service, and adding the capability to connect to water, gas, and electric service. It is understood that the preferred installation service may also include any service associated with the delivery of the good to the buyer address that the delivery agent 212 is contracted to perform.

Logistics intermediary 154 generates a master requisition and a manufacturer shipping number for each respective appliance order that is associated with the master requisition, as shown in step 118. Logistics intermediary 154 also generates an invoice associated with the master requisition showing the bill to be paid by store 158, also shown in step 116.

Logistics intermediary 154 next generates a bar coded master requisition number and manufacturing shipping number for each good to be shipped to a respective delivery agent, as illustrated in step 116. These bar codes are typically communicated to the delivery agent 212, step 118. In this specification the term "communicate" is defined to identify any form of communications, including but not limited to, being mailed, being delivered by courier, being faxed, and being communicated via the Internet. Logistics intermediary 154 next communicates, via the Internet, the manufacture shipping number and buyer shipping address for each order to store 158 which originally placed the order, as shown in step 120.

Respective store 158 next communicates, via the Internet, the manufacture shipping number and buyer mailing address to respective supplier 152, as illustrated in step 122. Respective supplier 152 can thus determine which delivery agent to ship the order to based on the buyer's shipping address. Respective supplier 152 next generates a respective purchase order, a purchase order label, and advance shipping notice, as shown in step 124. Respective supplier 152 then supplies the respective goods invoice to respective store 158 only for supplier branded goods, as shown in step 126. Respective supplier 152 next attaches the purchase order label to the goods. Respective supplier 152 next communicates the advance shipping notice to respective delivery agent 212 and ships the goods to respective delivery agent 212, as illustrated in step 128.

Delivery agent 212 has the capability of cross checking the shipping status and tracking the goods (step 130) utilizing any combination of three methods, 1) by monitoring the activity on the electronic manifest, 2) by reviewing the bar codes mailed from logistics intermediary 154, and 3) by receipt of the advance shipping notice from by supplier 152.

Upon receipt of goods delivery agent 212 notes receipt of goods and notes exceptions, as illustrated in step 132. Process step 132 is further illustrated in the process flow diagram shown in FIG. 5. When the goods are received by the delivery agent 212 the master schedule bar code on the outer carton is scanned. This substep is intended to provide shipping confirmation for the electronic manifest, which notes that the goods has arrived from supplier 152. Bar codes received from logistics intermediary 154 are attached to each good having a manufacturer shipping number. Finally, exceptions are recorded. In one exemplary embodiment an exception report includes an "overage", a good "shortage", a "damaged" good, or a "suspend" action as indicated in FIG. 6A by steps 256, 262, 264, and 266, respectively.

The term "overage" is defined in this specification to identify goods that were shipped which were not expected based on the electronic manifest or alternatively based on the advanced shipping notice. The model number of the "overage" good is recorded into scanner 159 for identification, upon prompting by display 161 showing the exceptions menu (FIG. 6B), from which the "overage" menu 262 (FIG. 6C) may be selected.

The term "shortage" is defined in this specification to identify goods that were expected to be shipped based on both the electronic manifest and based on the advanced shipping notice, but did not arrive. At this point the manufacturer shipping number from logistics intermediary 154 is keyed into scanner 159 by the user upon prompting by display 161 showing the exceptions menu 220 (FIG. 6B) from which the "shortage" menu 264 may be selected (FIG. 6C), as further discussed below.

The term "damage" is defined in this specification to identify goods that were shipped but there is visible damage to the shipping carton or to the goods, such as, scratches, dents, missing parts—the damage having a cumulative predetermined value, typically, greater than or equal to $20. The disposition of the goods is keyed into the scanner upon prompting by display 161 in the exception menu 220 (FIG. 6B), from which the "damage" menu 260 (FIG. 6C) may be selected. The damage good exception report triggers an issuance of a replacement order and a return authorization of the original good, as further described below.

The term "suspend" is defined in this specification to identify goods wherein the manufacturer shipping number labels and shipping requisition arrived but the order was not shipped. Generally, the order will be shipped on a subsequent shipment to delivery agent 212, as such, an exception process similar to the "shortage" process described above is followed. The "suspend" menu 266 is used, instead of the "shortage" menu 264 (FIG. 6C).

Figure 5:
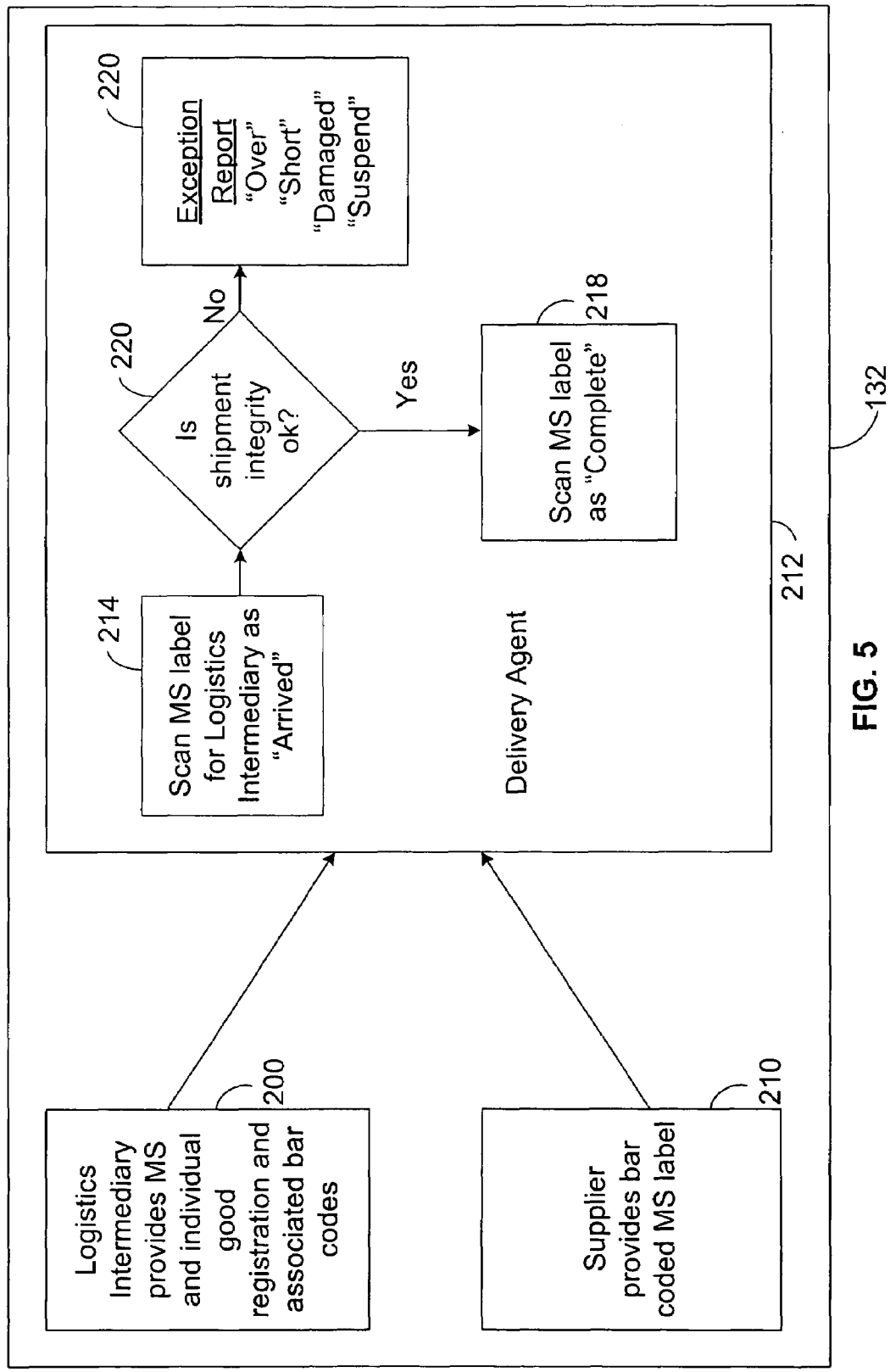
FIG. 5 is a process flow diagram for making exception reports after goods are shipped to the delivery agent.
Figures 1, 6A:
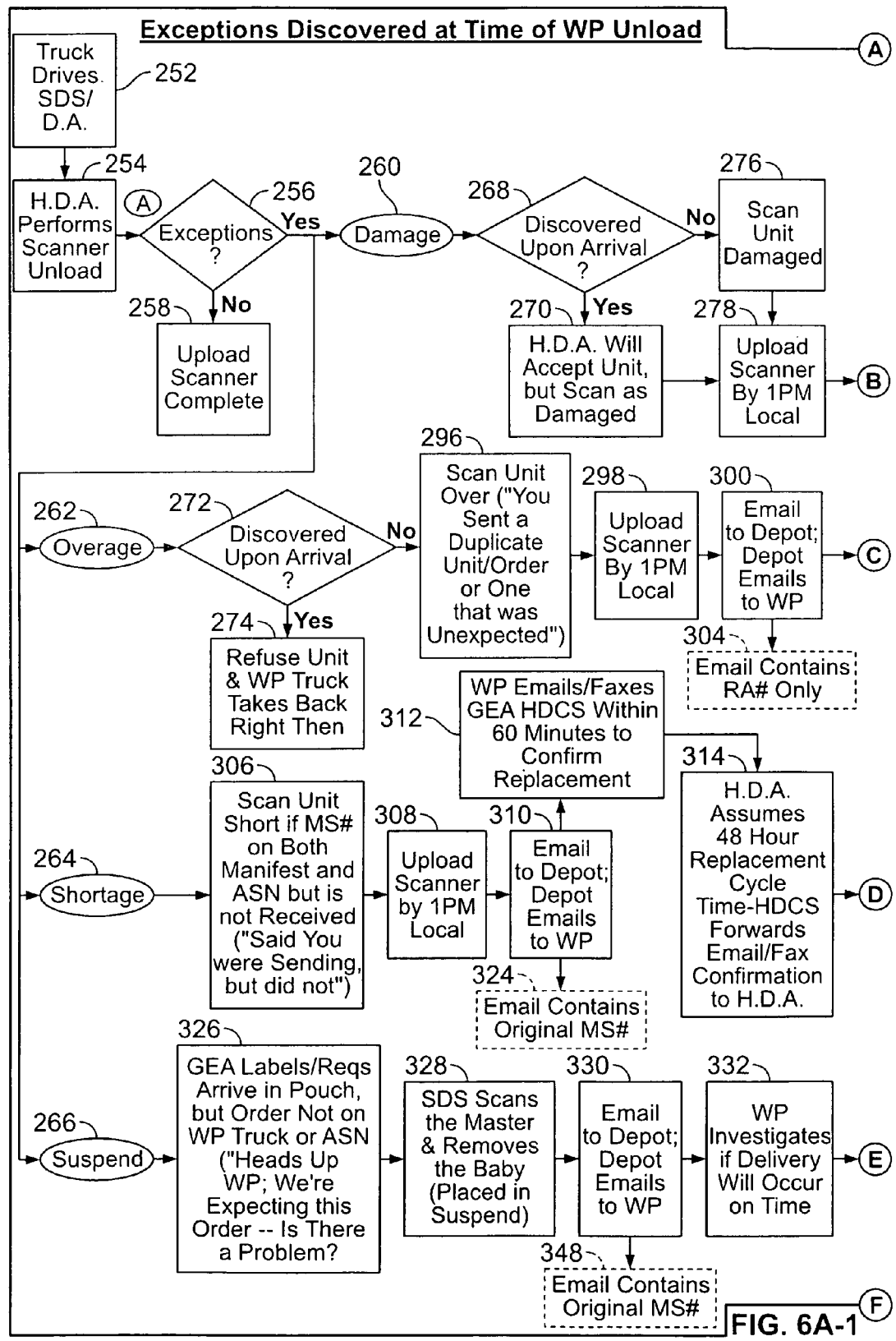
FIGS. 6A–6C illustrates further detail of the exception report process flow diagram of FIG. 5 and the associated scanner display screens.
Figures 2, 6A:
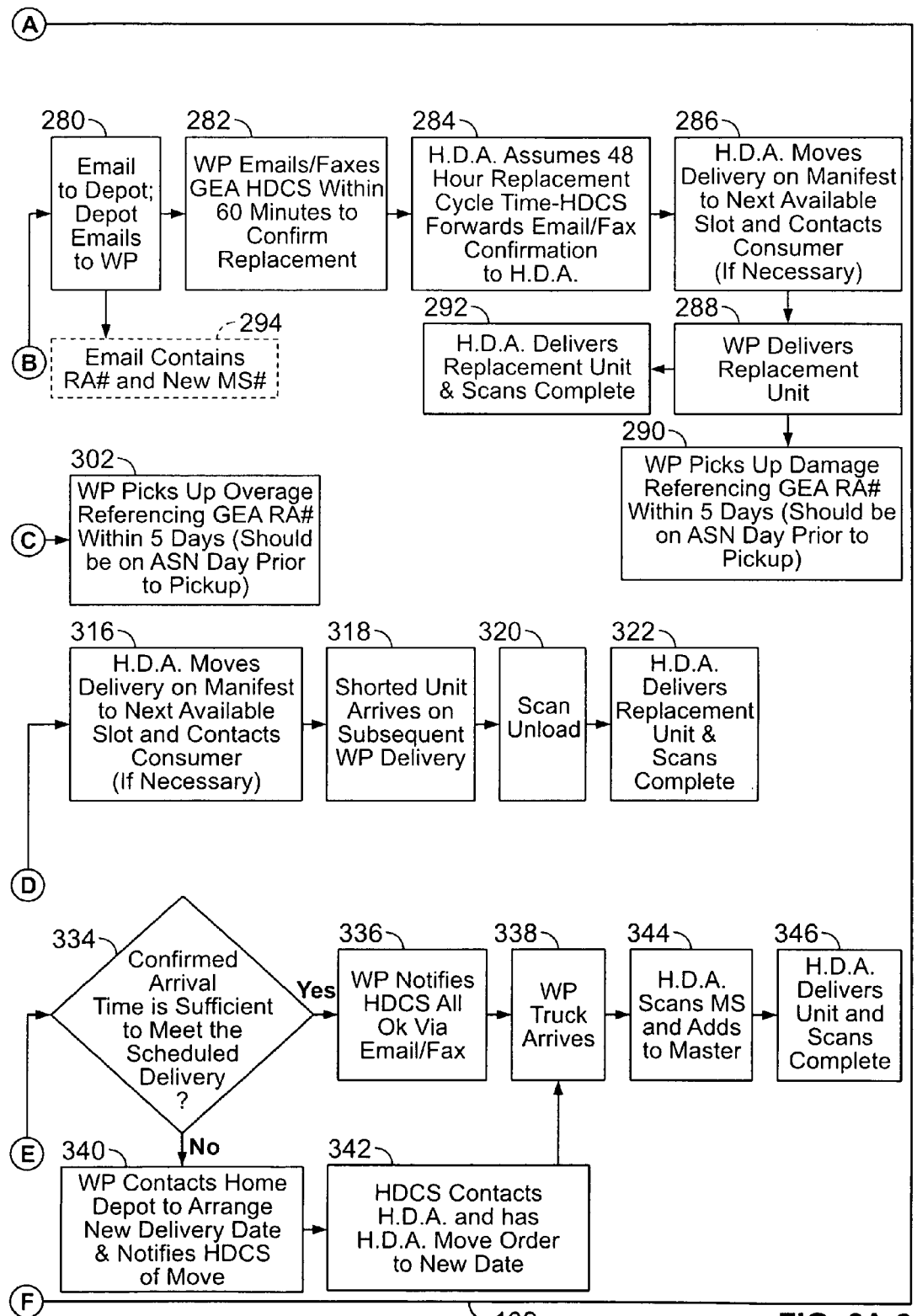
Figure 6B:
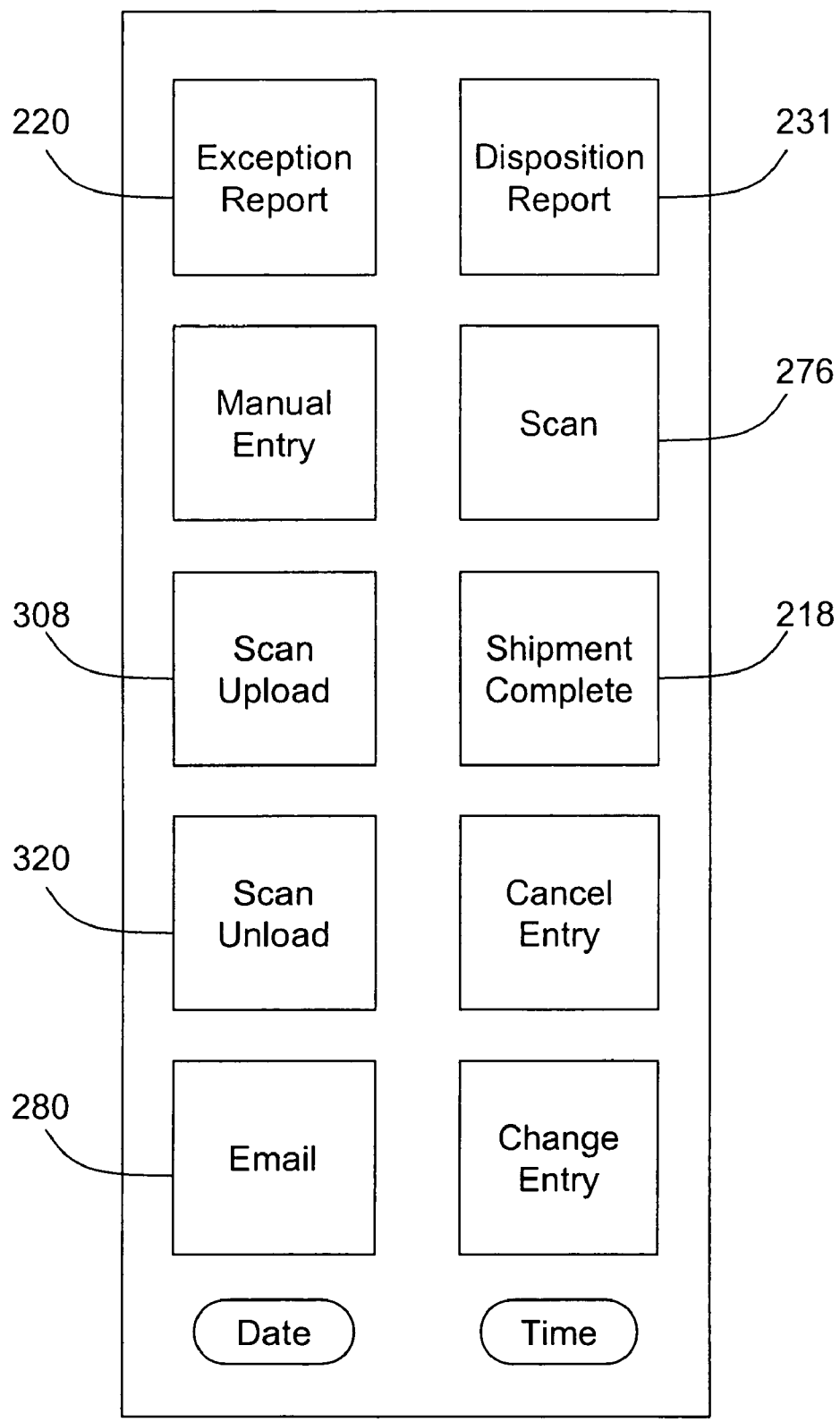
Figure 6C:
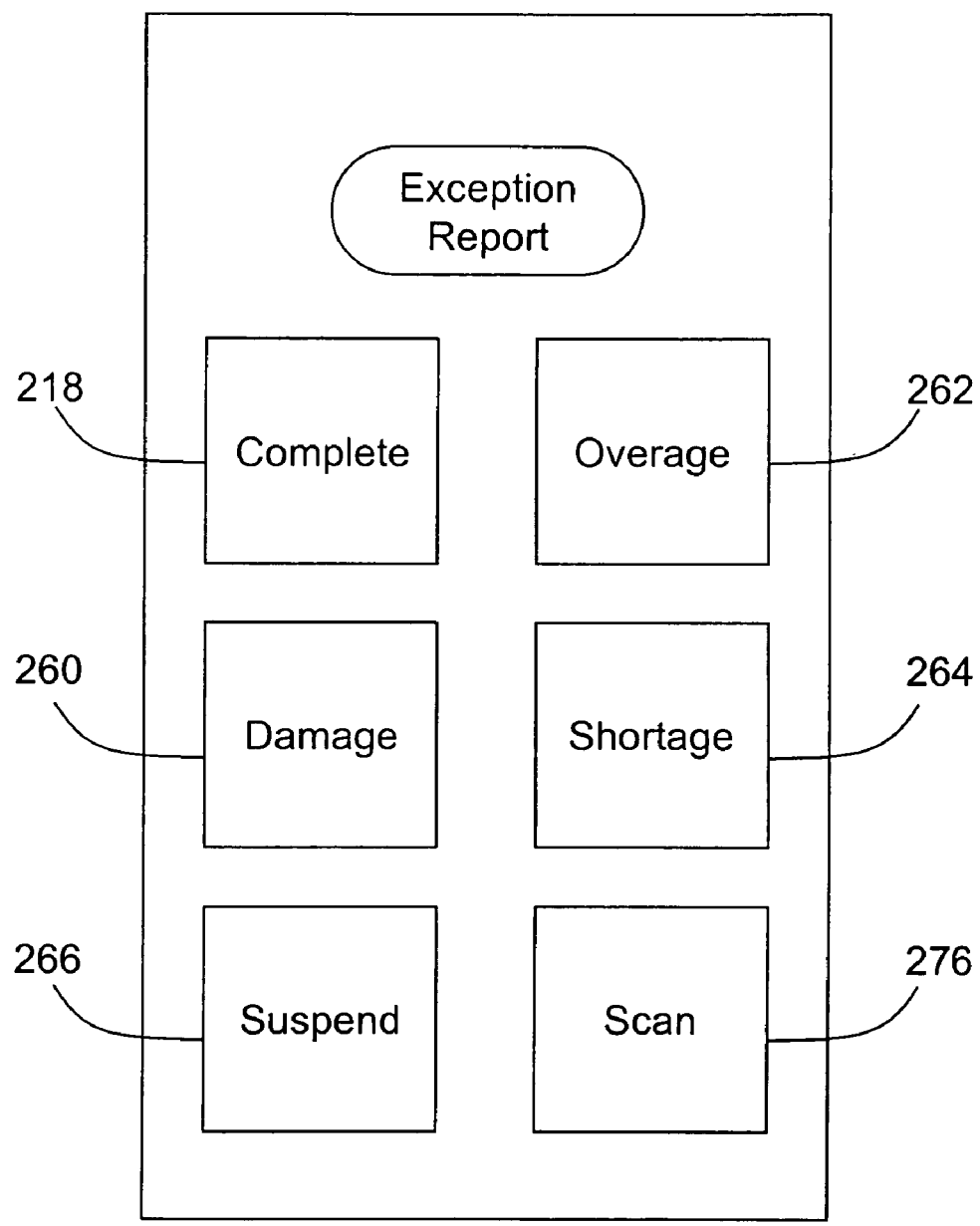

FIG. 6A further illustrates the exception process after the good is delivered to delivery agent 212 from supplier 152, as identified by step 132 of FIG. 5. The delivery agent performs a scanner upload, step 254. Scanner upload is defined in this specification to refer to transferring data from the scanner to logistics intermediary 154 via computing unit A 169. An exception report 220 is completed if necessary, step 256. The scanner is loaded with data from logistics intermediary 154 by up-link to communications network 160, step 258. Up-link generally occurs when scanner 159 is coupled to computing unit A 169 and the data collected by scanner 159 or the data to be loaded into scanner 159 is transferred. Data to be transferred must be placed in predetermined input fields compatible with input fields of an interface coupled to the electronic manifest. Table 1 is one example of input field sizes used by the electronic manifest and the delivery management system. When exception report 220 is generated one of the several actions may be taken. As described above, four types of exception report may be generated, including, a "damage" report 260, a "overage" report 262, a "shortage" report 264, and a "suspend" report 266.

TABLE 1

| EVENT CODE | CHARACTERS |
| --- | --- |
| Master requisition number | 2 characters |
| Manufacturer shipping number | 10 characters |
| Model number | 16 characters |
| Serial number | 9 characters |
| Reason code | 1 character |
| Condition code | 2 characters |
| Return authorization number | 10 characters |
| Replacement mfg. shipping number | 10 characters |
| Notes | 40 characters |

When the good shipped from supplier 152 is damaged and the damage was discovered upon the good arriving at delivery gent's place of business, delivery agent 212 scans the good as "damaged", step 270, otherwise the good is scanned as not being damaged, even though the good is damaged. Next, scanner 159 is uploaded to the logistics intermediary 154, step 278. It is noted that upload 278 may occur before a predetermined time of day, for example before one o'clock p.m. local time, to insure that the shipment will be credited on the day of shipment. Exception report 220 is communicated to respective store 158 and from respective store 158 to respective supplier 152, step, 280 via communications network 160. Exception report 220 comprises the old manufacturing shipping number and the new manufacturing shipping number, as illustrated in block 294. Supplier 152 communicates to logistics intermediary 154 the confirmation of the good replacement within a predetermined time, typically within one hour of notification of the exception report, step 282. Then logistics intermediary 154 sends confirmation to delivery agent 212, and a return authorization (RA) to delivery agent 212, step 284. Based on the assumption that the good will be replaced within about two days, delivery agent 212 enters the planned good delivery date in the electronic manifest and informs buyer 156 of the revised delivery date, step 286. Supplier 152 then arranges to pick-up the damaged good from delivery agent 212, using the manufacturer shipping number provided by logistics intermediary 154 and the return authorization, step 210.

When an "overage" is the cause for at least one extra good being shipped to delivery agent 212, and the deliver agent 212 does not discover the overage upon arrival to delivery agent's place of business, the overage good is scanned, step 296. If the good is discovered before scanning then the good is "refused" and is immediately shipped back to respective supplier 152. When the good was scanned the data is uploaded to logistics intermediary 154 by a predetermined time of day, typically by one o'clock p.m. local time, step 298. Exception report 220 is communicated to respective store 158 and from respective store 158 to respective supplier 152, step 300. Exception report 220 in this case contains only the return authorization number. Supplier 152 thus can pick-up the overage good at the delivery agent's place of business, step 302.

When a "shortage" occurs the delivery is scanned upon receipt, step 306, however, there is a shortage as defined above. When the label was scanned the data is uploaded to logistics intermediary 154 by a predetermined time of day, typically by one o'clock p.m. local time, step 308. Exception report 220 is communicated to respective store 158 and from respective store 158 to respective supplier 152, step 310. Exception report 220 comprises the original manufacturer shipping number only. Supplier 152 communicates to logistics intermediary 154 the confirmation of the shipment good within a predetermined time, typically within one hour of notification of the exception report, step 312. Based on the assumption that the good will be delivered on the next shipment to delivery agent 212, logistics intermediary 154 automatically enters the planned good delivery date in the electronic manifest and communicates to supplier 152 the revised delivery date, step 314. Delivery agent 212 moves the delivery date on the electronic manifest to the next available delivery date slot and informs buyer 156 of the revised delivery, step 316. The shorted good arrives on a subsequent delivery from supplier 152 to delivery agent 212, step 318. The good is unloaded and scanned, step 320. Delivery agent 212 ships the original good to the buyer's address, step 322 and enters in scanner 159 a "completed" disposition action, step 322.

When a "suspend" action occurs as defined above, the manufacturer shipping labels arrive from logistics intermediary 154 as expected but the order is not shipped, step 326. Delivery agent 212 scans the master requisition and performs a "remove" function to account for the manufacturer shipping label for the unavailable good, step 328. A "remove" function is employed to delete the manufacturing shipping number associated with the missing good from the master requisition and correspondingly from the electronic manifest. Exception report 220 is communicated to respective store 158 and from respective store 158 to respective supplier 152, step 330. Exception report 220 comprises the original manufacturer shipping number only, step 348. Supplier 152 determines whether the delivery will occur on time, step 332. If the delivery cannot occur on time (i.e. by the original delivery time), supplier 152 notifies respective store 158 to arrange for a new delivery date and supplier 152 notifies logistics intermediary 154 of the move, step 340. Logistics intermediary 154 notifies delivery agent 212 and delivery agent 212 moves the order to the new date, step 342. If the good will make the shipment on time, supplier 152 notifies logistics intermediary 154, and logistics intermediary notifies delivery agent 212 all is well and records a "complete" action into scanner 159 after the previously suspended good arrives, step 336. Supplier 152 delivers the previously suspended good to delivery agent 212, step 338. Delivery agent 212 scans the manufacturing shipping number label and adds the label to the master requisition, step 344. Next, delivery agent 212 delivers good to buyer's address performs a "completed" disposition action on scanner 159, step 346.

Referring again to FIGS. 3 and 4, delivery agent 212, after completing the disposition of the goods, communicates the disposition of the goods to logistics intermediary 154 via communications network 160, as illustrated by step 136 (FIG. 4). Logistics intermediary 154 then communicates the disposition of the goods to store 158 and Supplier 152, via communications network 160, as shown is steps 138 and 140.

Logistics intermediary 154 next generates buyer address shipping labels and communicates the labels to respective delivery agent 212. Respective delivery agent 212 affixes each respective shipping label to a respective shipping carton, as illustrated by step 134. Respective delivery agent 212 next confirms the delivery date and time with respective buyer 156 and ships the goods to respective buyer 156, as shown in steps 142 and 144. Finally, respective delivery agent 212 communicates the goods delivery disposition to logistics intermediary 154, as illustrated in step 146.

Figure 7:
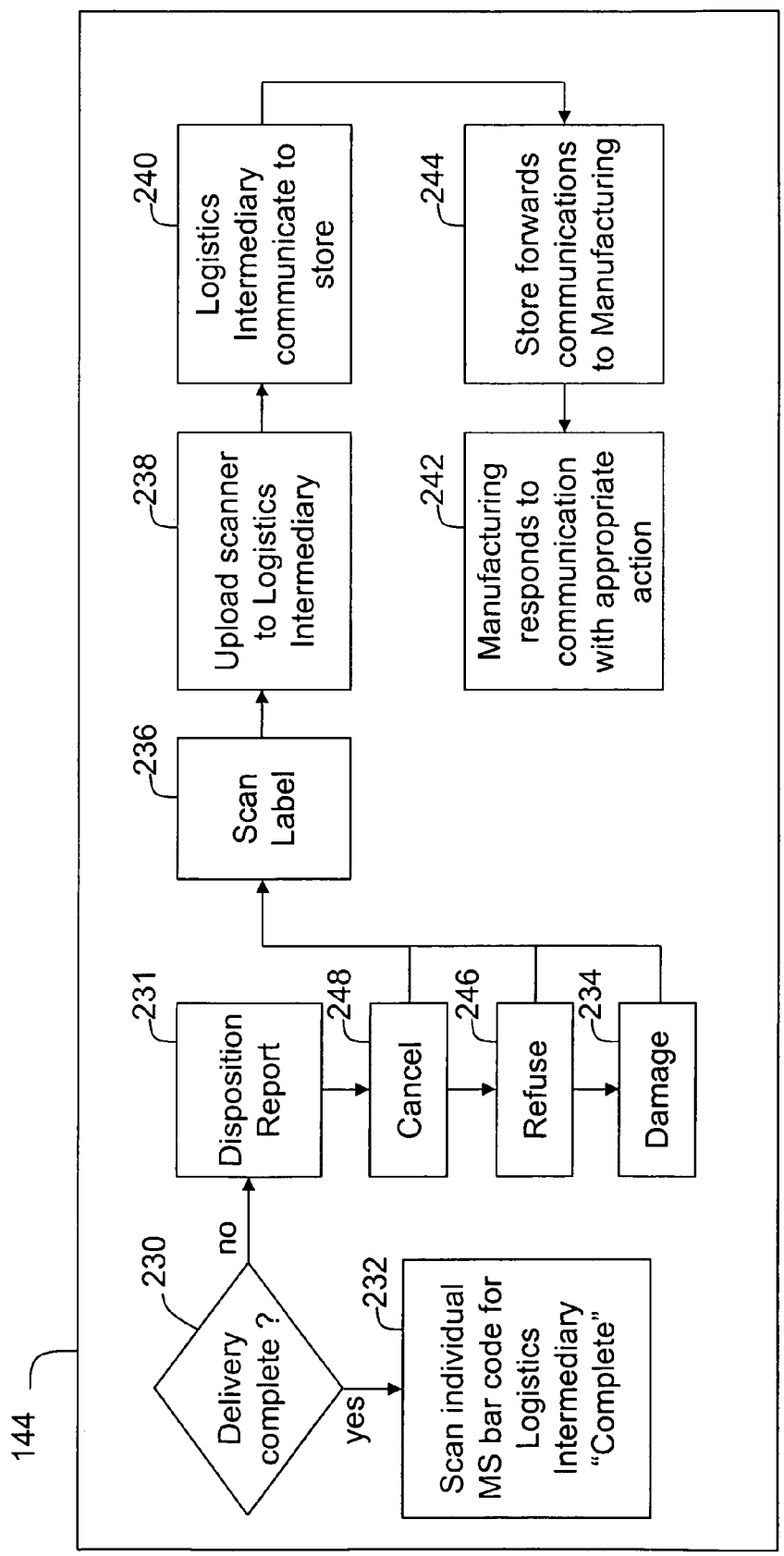
FIG. 7 is a process flow diagram for the disposition report after goods are shipped to the buyers address.

FIG. 7, further illustrates the delivery disposition identified in step 144 (FIG. 4). After delivery of goods to buyer 156, delivery agent 212 has an number of disposition responses available (FIG. 2). Each disposition response is indicated on display 173 of scanner 159 when scanner 159 is in the disposition mode. In one exemplary embodiment the disposition mode includes the following four categories, "complete", "damage", buyer "refusal" and "cancel", as illustrated by step 232, 234, 246 and 248, respectively, of process step 144 (FIG. 4).

Figure 8A:
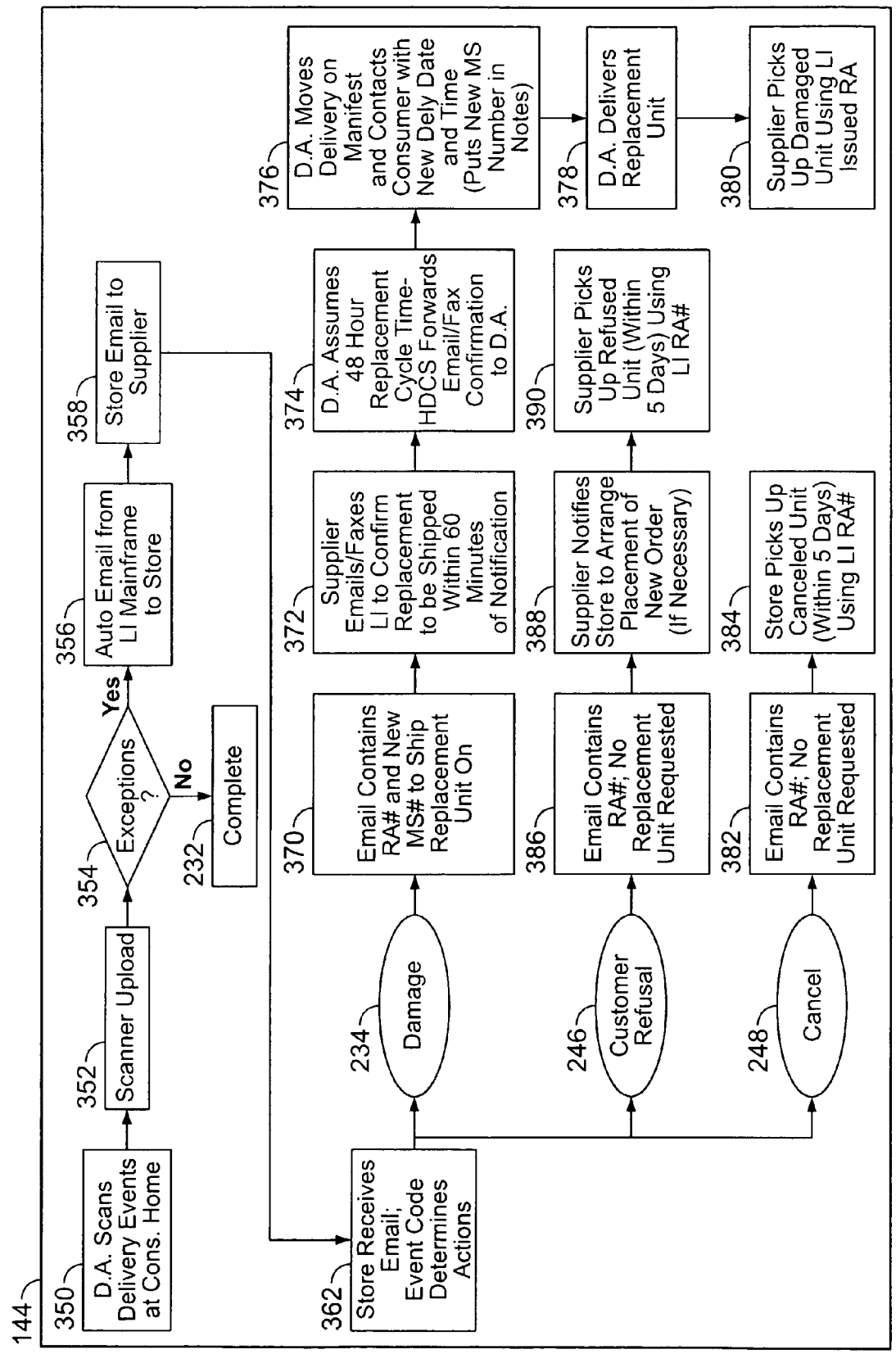
FIGS. 8A and 8B illustrated further detail of the disposition report process flow diagram and associated scanner display screen of FIG. 7.
Figure 8B:
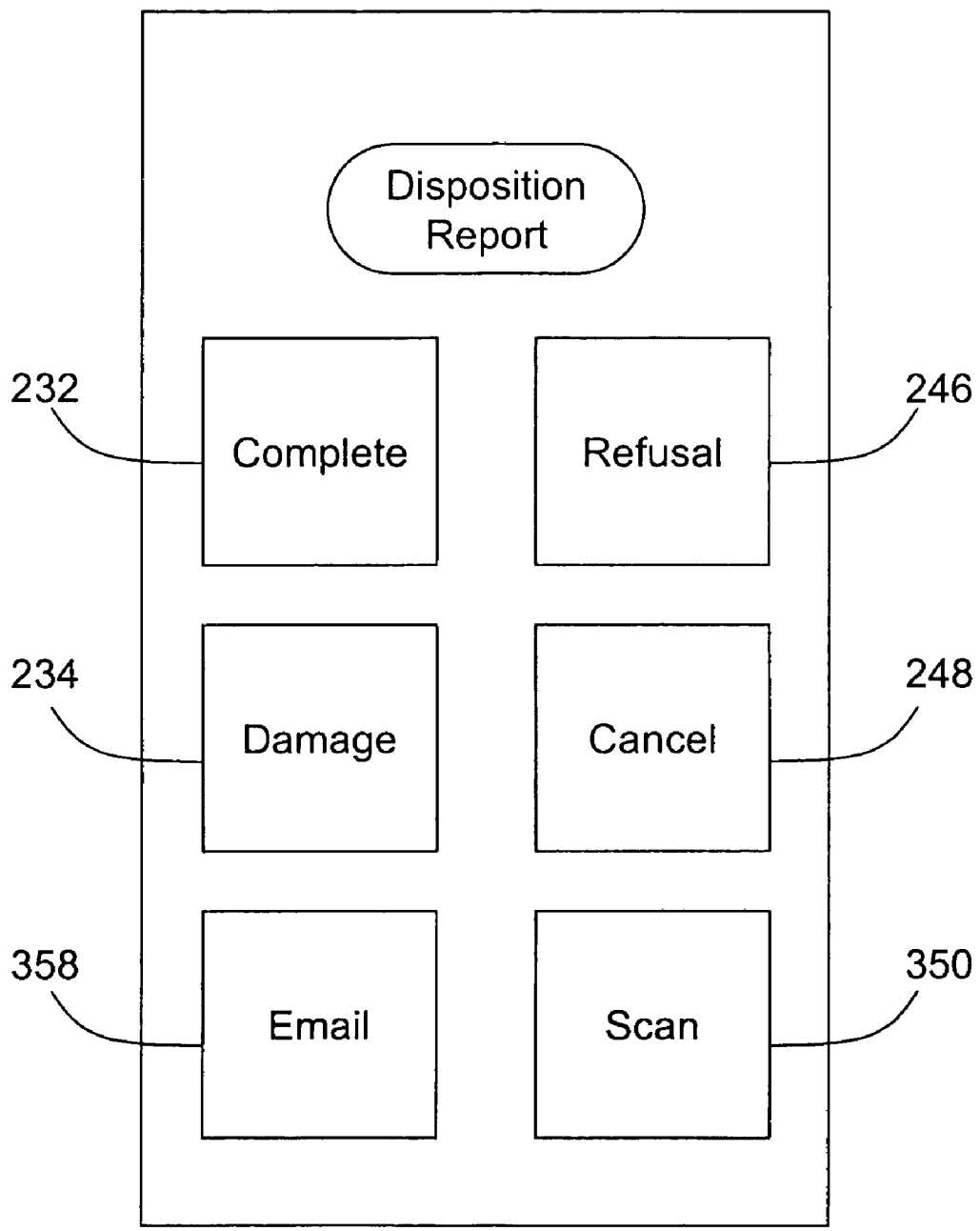

When the shipment and installation is completed according to schedule, delivery agent 212 selects the delivery disposition function on the scanner as is shown in FIG. 8B in one exemplary illustration, selects the disposition "complete" 232 menu, and notes that the installation is complete for each respective manufacturer shipping number by scanning the shipping label of each appliance installed, as shown by step 236.

For each appliance that is damaged the "damage" menu 234 is selected and each appliance that is damaged is scanned. Next, the disposition of the damaged appliance is logged and the appliance can either be accepted by buyer 156 with a predetermined credit assigned according to the type of damage, or the damaged appliance can be returned to the delivery agent 212. Table 2 illustrated one example schedule of reduced credits for various levels of damage.

TABLE 2

| DAMAGE | CREDIT |
| --- | --- |
| Non-visible damage | $20 |
| Visible dent or scratch | $100 |
| Non-working feature | $100 |
| Wrong color | $20 |

It is understood that other damage dispositions are possible, as such, those identified in this section are for illustrative purposes only, and are not intended to limit implementation options.

Buyer 156 may also refuse a delivered good. When this occurs delivery agent 212 selects the buyer "refusal" menu 246 on the scanner, then selects among a list the reason for the refusal, as illustrated by step 246 in FIG. 7. An exemplary customer refusal list includes the identified codes and values in TABLE 3.

TABLE 3

| REFUSAL CODE | VALVE |
| --- | --- |
| Damaged - not acceptable - crated | A |
| Damaged - not acceptable - uncrated | B |
| Defective | E |
| Duplicate order | F |

TABLE 3-continued

| REFUSAL CODE | VALVE |
| --- | --- |
| Customer order error | I |
| ASM order error | J |
| Shipment error | K |
| Order service error | L |
| Wrong model | M |
| Wrong color | N |
| Did not need | O |
| Did not order | P |
| Other reason | Z |

Finally, the order may have been cancelled even though the paperwork and electronic manifest indicated that the goods be delivered to buyer 156. In this case delivery agent 212 selects the "cancel" menu 248 and scans the bar code label of the goods which were cancelled, as illustrated by step 248 and further described below.

The general process for the delivery disposition is further illustrated by FIG. 7, as shown in steps 236 through 242. The shipping label is scanned, the scanner data is communicated to logistics intermediary 154 by up-link to the internet. Once the data is loaded in the electronic manifest it is available to all entries coupled to communications network 160 (FIG. 1), in the case store 158 and supplier 152. Store 158 and supplier 152 then can respond with appropriate action, as further described below.

FIG. 8A further illustrates the disposition process after the good is delivered to the designated address of buyer 156. Data gathered during delivery is transferred into computing unit A 169 (FIG. 2), then uploaded to the logistics intermediary 154. If no exceptions occurred then the good is considered to be properly delivered and installed, as such, a "complete" disposition report is communicated to logistics intermediary 154, step 232. When there is a disposition report logistic intermediary 154 sends a transmittal containing the disposition report to respective store 158, step 356. Respective store 158 sends the disposition report to respective supplier 152, step 362. Respective supplier 152 next determines the disposition of disposition report 231 based on the "damage" report 234, a customer "refusal" 246 and alternatively, a "cancel" report 248 as described above.

When disposition report 231 relates to a "damaged" good then disposition report 231 comprises the old manufacturer shipping number and a new manufacturer shipping, step 370, that is shipped with the replacement good. Supplier 152 communicates to logistics intermediary 154 the confirmation of the good replacement within a predetermined time, typically within about one hour of notification of the disposition report, step 32. Then logistics intermediary 154 sends confirmation to the delivery agent 212, and generates a return authorization for delivery agent 212, step 374. Based on the assumption that the good will be replaced within about two days, the delivery agent 212 enters the planned good delivery date in the electronic manifest and informs buyer 156 of the new delivery date, step 376. Delivery agent 212 delivers the replacement good to the buyers address and picks up the damaged good, step 378. Supplier 152 then arranges to pick-up the damaged good from delivery agent 212 using the manufacturer shipping number and the return authorization provided by logistics intermediary 154, step 380.

When disposition report 231 results from a customer "refusal", step 246, disposition report 231 comprises the manufacturer shipping number. No replacement good is requested in the situation. The supplier 152 notifies respective store 158 to arrange the placement of a new order, step 388. The supplier 152 then arranges to pick-up the refused good at delivery agent 212 using the manufacturer shipping number and return authorization provided by logistics intermediary 154, step 390.

When disposition report 231 results from a "cancelled" order, step 248, the disposition report comprises the manufacturer shipping number from the logistics intermediary 154, step 382. No replacement good is requested under these circumstances. The supplier 152 then arranges to pick-up the cancelled good using the manufacturer shipping number and the return authorization supplied by logistics intermediary 154 as the good identifier.

The present invention comprises an Internet based goods delivery system 100 having components that cooperate in a process that integrates logistical supply chain parties by utilizing the Internet, commercially available scanners, and Internet based programs. The system creates the capability for a product distribution supplier to seamlessly interact with sellers of the supplier's products and suppliers to the sellers and buyers. All parties of the logistical supply chain execute roles and responsibilities while minimizing human interaction between the parties. The goods delivery system comprises a plurality of stores 158, suppliers 152, at least one delivery agent 212, and a logistics intermediary 154, which all interact via communications network 160, as illustrated in FIG. 1. Goods delivery system 100 uses process flow 150, identified in FIG. 4 to move goods having different brands from respective supplier 152 to respective buyer 156, using at least one delivery agent 212. Since the process is integrated and communication is contemporaneous maintained between all parties human interaction is minimized.

It will be apparent to those skilled in the art that while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of delivering goods from a supplier to a buyer utilizing a system having at least one delivery agent, at least one store, at least one supplier, and a plurality of buyers, wherein the at least one delivery agent, the at least one store, and the at least one supplier are coupled to a communications network, said method comprising the steps of:

contemporaneously communicating respective order information from a respective store to a logistics intermediary;

generating respective invoice information from said respective order information;

electronically communicating said respective invoice information from said logistics intermediary to a respective delivery agent based on an electronic manifest;

noting exceptions and electronically communicating the exceptions to said logistics intermediary, wherein the exceptions are noted and electronically communicated by said respective delivery agent;

electronically communicating the exceptions from said logistics intermediary to a respective supplier and to the respective store from which goods were ordered;

electronically communicating a disposition status of respective shipped goods from said respective delivery agent to said logistics intermediary;

responding, by said respective supplier, based on conditions of the respective shipped goods provided by said respective delivery agent to said respective supplier via said logistics intermediary, wherein said responding based on the conditions includes rescheduling an order, by the respective supplier, based on the conditions reported via a graphical user interface by the respective delivery agent after the respective shipped goods are received by the respective delivery agent that delivers the respective shipped goods to one of the buyers of the respective shipped goods, wherein said rescheduling the order is based on at least one of:

a reception, via a graphical user interface, of whether the respective shipped goods are noticed as being damaged after the respective shipped goods are received by the respective delivery agent; and a reception, via the graphical user interface, of whether the respective shipped goods shipped to the respective delivery agent are not expected to be received by the respective delivery agent; and updating said electronic manifest, wherein said electronic manifest is updated by said logistics intermediary.

2. The method of delivering goods as recited in claim 1, wherein said step of electronically communicating the disposition status of the respective shipped goods further comprising the step of shipping said ordered goods from said respective delivery agent to a respective buyer.

3. The method of delivering goods as recited in claim 1, wherein said communications network is an Internet based communication system.

4. The method of delivering goods as recited in claim 3, further comprising the step of selecting at least one delivery date based on available delivery capacity for each respective delivery agent.

5. The method of delivering goods as recited in claim 4, further comprising the step of adding delivery information to said electronic manifest, wherein the delivery information is added by the respective supplier, and the delivery information comprises a quantity, type, and delivery date of respective goods to be delivered to said respective delivery agent.

6. The method of delivering goods as recited in claim 5, wherein each respective buyer selects a delivery date for each respective good based on an available delivery schedule identified in said electronic manifest.

7. The method of delivering goods as recited in claim 1, wherein said order information communicated by a respective buyer comprises a brand of good, type of good selected, model number of the good selected, an installation service selected, a delivery address, and a delivery date selected.

8. The method of delivering goods as recited in claim 7, further comprising:

generating a respective invoice, wherein said respective invoice is generated by said logistics intermediary; and communicating the respective invoice from said logistics intermediary to said respective store.

9. The method of delivering goods as recited in claim 8, further comprising the step of communicating respective master requisition labels and associated manufacturer shipping labels from said logistics intermediary to said respective delivery agent.

10. The method of delivering goods as recited in claim 9, further comprising the step of communicating said respective master requisition labels and an associated manufacturer shipping number from said logistics intermediary to said respective store.

11. The method of delivering goods as recited in claim 10, further comprising the step of communicating said respective manufacturer shipping number and associated shipping address from said respective store to said respective supplier.

12. The method of delivering goods as recited in claim 11, further comprising the step of generating a respective purchase order, advance shipping notice, and purchase order label associated with a respective master requisition number, wherein the respective purchase order, the advance shipping notice, and the purchase order label are generated by said respective supplier.

13. The method of delivering goods as recited in claim 12, further comprising the step of communicating a respective purchase order invoice from said respective supplier to said respective store.

14. The method of delivering goods as recited in claim 9, further comprising the step of communicating a respective manufacturer shipping number and associated shipping address from said logistics intermediary to said respective store.

15. The method of delivering goods as recited in claim 14, further comprising the step of delivering respective goods from said respective supplier to said respective delivery agent.

16. The method of delivering goods as recited claim 15 further comprising the step of attaching the shipping labels obtained from said logistics intermediary to said respective good, wherein the shipping labels are attached by said respective delivery agent.

17. The method of delivering goods as recited in claim 16, further comprising the step of communicating a shipping status and exceptions from said respective delivery agent to said logistics intermediary.

18. The method of delivering goods as recited in claim 17, further comprising the step of communicating the shipping status and exceptions from said respective delivery agent to said respective store.

19. The method of delivering goods as recited in claim 17, further comprising the step of communicating the shipping status and exceptions from said respective store to said respective supplier.

20. The method of delivering goods as recited in claim 19, further comprising the step of confirming the respective good delivery date and associated delivery time of day with said respective buyer, wherein the respective good delivery date and associated delivery time of day are confirmed by said respective delivery agent.

21. The method of delivering goods as recited in claim 20, further comprising the step of delivering the respective goods to the respective buyer, wherein the respective goods are delivered to the respective buyer by said respective delivery agent.

22. The method of delivering goods as recited in claim 16, further comprising the step of communicating a shipping disposition from said respective delivery agent to said logistics intermediary.

23. The method of delivering goods as recited in claim 7, wherein the installation service desired comprises a type of installation of a respective good at an address of the respective buyer.

24. The method of delivering goods as recited in claim 1 wherein the step of noting exceptions comprises the step of identifying "overage", "shortage", "damage", and "suspend".

25. The method of delivering goods as recited in claim 1 further comprising the step of recording a shipping disposition, wherein said recording the shipping disposition comprises the step of identifying "complete", "damage", "refusal", and "cancel".

26. A system for delivering goods from a plurality of suppliers to a plurality of buyers based on respective orders placed by the plurality of buyers, said system comprising:

a communications network;

a logistics intermediary coupled to said communications network, said logistics intermediary having an electronic manifest; wherein said logistics intermediary is configured to adjust good deliveries based on an exception report;

at least one delivery agent coupled to said communications network, wherein said at least one delivery agent is configured to deliver and install a first set of goods ordered by a respective buyer based on information in said electronic manifest;

at least one supplier configured to generate order reschedules of a second set of goods based on conditions, of the first set of goods, provided by the at least one delivery agent to said at least one supplier via said logistics intermediary, wherein said at least one supplier is configured to generate the order reschedules by creating the order reschedules based on the conditions reported by the at least one delivery agent via a graphical user interface after the first set of goods are received by the at least one delivery agent that delivers the first set of goods to the respective buyer, wherein said at least one supplier is configured to generate the order schedules based on at least one of:

a reception, via a graphical user interface, of whether the goods within the first set are noticed as being damaged after the first set of goods is received by the at least one delivery agent; and a reception, via the graphical user interface, of whether the first set of goods shipped to the at least one delivery agent is not expected to be received by the at least one delivery agent; and at least one store coupled to said communications network, wherein said at least one store is adapted to receive order information generated by each respective buyer and communicate the order information to said logistics intermediary via said communications network.

27. The system for delivery of goods as recited in claim 26, wherein said communications network is an Internet based communications network.

28. The system for delivery of goods as recited in claim 27, wherein said communications network further comprises at least one computing unit A having a display and being adapted to be coupled to an Internet based server.

29. The system for delivery of goods as recited in claim 28, wherein said communications network further comprises a computing unit B having a display and being configured to communicate with said at least one computing unit A via the Internet based server.

30. The system for delivery of goods as recited in claim 29, wherein said computing unit B is adapted to house the electronic manifest and the system for delivery of goods.

31. The system for delivery of goods as recited in claim 29, wherein said computing unit A further comprises a scanner, said scanner being adapted to scan bar code labels and to uplink and unload data via said respective computing unit A to said logistics intermediary.

32. The system for delivery of goods as recited in claim 31, wherein said scanner further comprises a scanner display and keyboard input.

33. The system for delivery of goods as recited in claim 26, wherein said logistics intermediary is configured to generate a master requisition label, associated manufacturer shipping labels, and an advanced shipping notice.

34. The system for delivery of goods as recited in claim 26, wherein said logistics intermediary is configured to communicate with a respective store, a respective delivery agent, and a respective supplier.

35. The system for delivery of goods as recited in claim 34, wherein said logistics intermediary is configured to communicate with said respective store, said respective delivery agent, and said respective supplier in a manner selected from a group including, mail, courier, fax, and the Internet.

36. The system for delivery of goods as recited in claim 26, wherein a respective supplier is configured to generate a purchase order for a respective store based on the order information generated by the respective buyer.

37. The system for delivery of goods as recited in claim 30, wherein a scanner employs a computer program having an exception report and a disposition report.

38. The system for delivery of goods as recited in claim 37, wherein said scanner employs the computer program having an exception report comprising a overage menu, a shortage menu, a damaged menu, and a suspend menu, each respective menu being selectable from a display of said scanner.

39. The system for delivery of goods as recited in claim 37, wherein said scanner employs the computer program having a disposition report comprising a complete menu, a damage menu, a refusal menu, and a cancel menu, each respective menu being selectable from the display of said scanner.

40. A system for integrating information for the delivery of goods from a supplier to a buyer, the system having at least one delivery agent, at least one store, at least one supplier, and a plurality of buyers, said system comprising:

means for utilizing a communications network to transfer order and shipping information between a respective supplier, a respective delivery agent, and a respective store;

means for utilizing a logistics intermediary coupled to said communications network, said logistics intermediary being configured to employ an electronic manifest;

means for providing order and shipping information to the at least one delivery agent and the at least one supplier, wherein said at least one delivery agent is configured to deliver and install a first set of goods ordered by the respective buyer based on information in said electronic manifest;

means for scheduling a shipment of a second set of goods produced by the at least one supplier based on said order and shipping information, and an exception report, wherein said at least one supplier is configured to generate order reschedules of the second set of goods based on conditions, of the first set of goods, provided by said at least one delivery agent to said at least one supplier via said logistics intermediary, and the at least one supplier is configured to generate the order reschedules by creating the order reschedules based on the conditions reported by the respective delivery agent via a graphical user interface after the first set of goods are received by the respective delivery agent that delivers the first set of goods to the respective buyer, wherein said at least one supplier is configured to generate the order scheduyles based on at least one of:

a reception, via a graphical user interface, of whether the goods within the first set are noticed as being damaged after the first set of goods is received by the at least-one delivery agent; and a reception, via the graphical user interface, of whether the first set of goods shipped to the at least one delivery agent is not expected to be received by the at least one delivery agent; and means for updating the electronic manifest after the order has been executed.

41. The system for integrating information as recited in claim 40, wherein said means for utilizing a communications network comprises means for the at least one store to receive said order information generated by each respective buyer and communicate the order information to said logistics intermediary.

42. The system for integrating information as recited in claim 40, wherein said means for utilizing a communications network further comprises means for said logistics intermediary communicating with the respective store, the respective delivery agent, and the respective supplier in a manner selected from a group including, mail, courier, fax, and the Internet.

43. The system for integrating information as recited in claim 42, wherein means for updating the electronic manifest further comprises means for generating said exception report.

44. The system for integrating information as recited in claim 43, wherein said exception report comprises a overage menu, a shortage menu, a damaged menu, and a suspend menu.

45. The system for integrating information as recited in claim 43, wherein means for updating the electronic manifest further comprises means for generating a disposition report.

46. The system for delivery of goods as recited in claim 26, wherein said logistics intermediary is further configured to adjust good deliveries based on a disposition report.

47. A system having at least one delivery agent, at least one store, at least one supplier, and a plurality of buyers, wherein the at least one delivery agent, the at least one store, and the at least one supplier are coupled to a communications network, said system comprising:

a logistics intermediary configured to electronically communicate respective invoice information to a respective delivery agent based on an electronic manifest, said logistics intermediary further configured to electronically communicate said respective invoice information via a server to said respective delivery agent, said respective invoice information generated from respective order information, said respective delivery agent configured to note exceptions and electronically communicate via the server the exceptions to said logistics intermediary, said at least one supplier configured to respond based on conditions, of a plurality of shipped goods, provided by said respective delivery agent to said at least one supplier via said logistics intermediary, and the at least one supplier configured to generate a plurality of order reschedules by creating the order reschedules based on the conditions reported by the respective delivery agent via a graphical user interface after the goods are received by the respective delivery agent that delivers the goods to one of the buyers, wherein the at least one supplier configured to schedule a pick-up of an overage good upon receiving an entry, via a graphical user interface, of the overage good, wherein the overage good is received by the respective delivery agent and is not expected to be received by the respective delivery agent; and a respective store configured to contemporaneously communicate via the server respective order information to said logistics intermediary.

48. The system as recited in claim 47, wherein said logistics intermediary further configured to electronically communicate exceptions to a respective supplier.

49. The system as recited in claim 48, wherein said logistics intermediary configured to electronically communicate exceptions to a respective store from which goods were ordered.

50. The system as recited in claim 48, wherein said respective delivery agent configured to electronically communicate a disposition status of respective shipped goods to said logistics intermediary and said logistics intermediary configured to update said electronic manifest.

51. The method of delivering goods as recited in claim 1 further comprising notifying the delivery agent of said rescheduling of the order via a graphical user interface.

52. The method of delivering goods as recited in claim 1, wherein the respective shipped goods are not expected to be received by the respective delivery agent based on one of a shipping notice sent to the respective delivery agent before the respective shipped goods are received by the respective delivery agent.

* * * * *

UNITED STATES PATENT AND TRADEMARK OFFICE
CERTIFICATE OF CORRECTION

PATENT NO.       : 7,191,142 B1                                             Page 1 of 1
APPLICATION NO.  : 09/475630
DATED            : March 13, 2007
INVENTOR(S)      : Sandell et al.

It is certified that error appears in the above-identified patent and that said Letters Patent is hereby corrected as shown below:

In Claim 40, column 14, line 65, delete "scheduyles" and insert therefor --schedules--.

Signed and Sealed this

Nineteenth Day of August, 2008

JON W. DUDAS
*Director of the United States Patent and Trademark Office*